Dec. 14, 1926.
H. M. EVANS
ANIMAL TRAP
Filed May 23, 1924
1,611,010
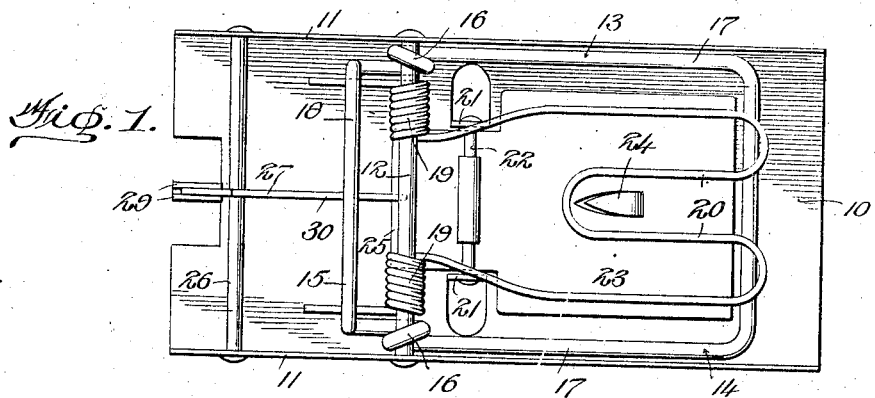
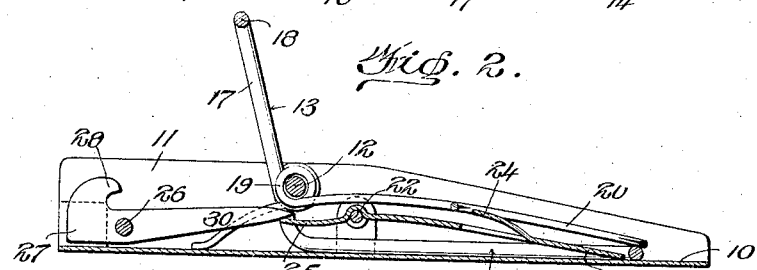
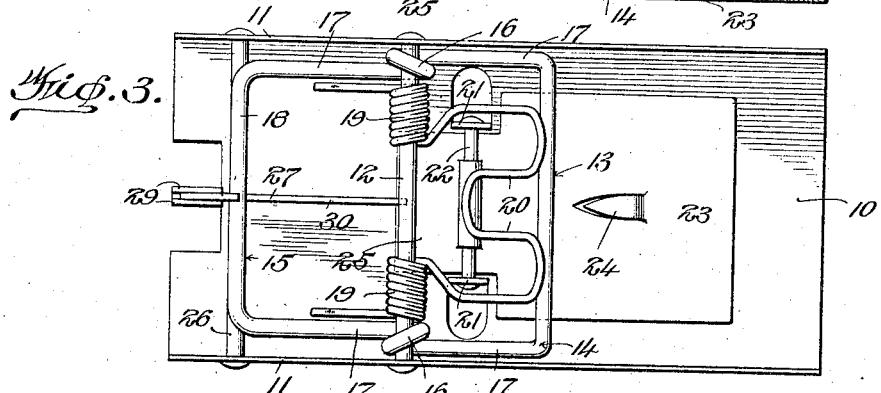
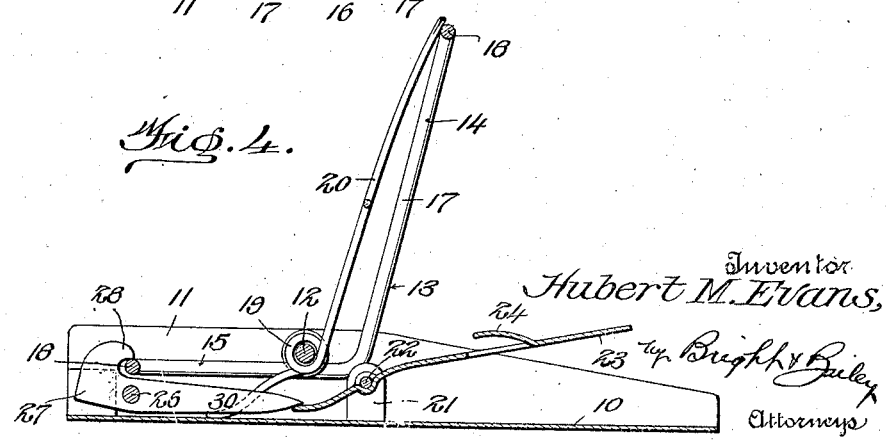
Inventor
Hubert M. Evans,
by Bright & Bailey
Attorneys Patented Dec. 14, 1926.

1,611,010

UNITED STATES PATENT OFFICE.

HUBERT M. EVANS, OF HARVARD, ILLINOIS.

ANIMAL TRAP.

Application filed May 23, 1924. Serial No. 715,425.

My invention relates to animal traps of the spring actuated, trigger released swinging jaw type, and my purposes are to provide a trap of this kind that is simple in construction, cheap and easy to produce, and positive in its action; that may be baited and set without danger of injury to the user, and that may readily be manipulated to victim released position without the necessity of touching the victim.

With the foregoing and other purposes in view my invention consists in the novel features of construction, combination and arrangement of parts as will be hereinafter more fully described, illustrated in the accompanying drawings and defined in the appended claim.

In the drawings, wherein like characters of reference denote corresponding parts in the different views.

Figure 1 is a plan view of an animal trap embodying the novel and essential features of my invention, the same being shown in normal or unset position;

Figure 2, a central longitudinal section through the trap as shown in Figure 1;

Figure 3, a view similar to Figure 1 showing the trap in set position; and

Figure 4, a central, longitudinal section through the trap as shown in Figure 3.

Referring to the drawings in detail, 10 designates an elongated, preferably rectangularly shaped base formed from any suitable material, such as sheet metal and having rising therefrom along its longitudinal edges, flanges 11, 11. Extending transversely across the base, above and intermediate the ends of the same, and secured between the flanges 11, 11 is a pin 12, and on this pin is pivoted a member 13, formed in this instance from a single piece of material such as stiff wire bent to provide a U-shaped jaw 14 and a U-shaped jaw extension 15 with eyes 16, 16 between them through which the pin 12 passes whereby, as aforesaid, the member is pivoted to said pin. Both the jaw 14 and the jaw extension 15 are composed of spaced parallel side portions 17, 17 connected respectively by transverse bight portions 18, and as best shown in Figures 2 and 4 of the drawings. The jaw and jaw extensions are disposed at an obtuse angle with respect to one another, so that when the jaw is in contact with the base as shown in Figure 2, the jaw extension is disposed substantially vertically above the base, and when the jaw is moved to set position as shown in Figure 4, the jaw extension is disposed substantially parallel to the base.

A spring wire adjacent to each of its ends is coiled as at 19 around the pin 12 and at its ends is engaged with the base 10 whereby its intermediate portion, which is extended into engagement with the normally upper portion of the bight 18 of the jaw 14, is constantly urged by the torsional action of the coils 19 to force said jaw towards the base, and as will be observed, the intermediate portion of the spring is bent to provide a grid 20 the purpose of which will presently appear.

Bent upward from the base 10, or otherwise formed on or attached thereto intermediate its ends is a pair of transversely spaced lugs 21, 21 between which is supported a transversely extending pin 22, and on this pin is pivoted a trigger 23 in the form of a relatively wide plate provided with a prong or other suitable means as indicated at 24 for attaching a bait thereto. Pin 22 preferably is located adjacent to pin 12, and trigger plate 23 extends from said pin in the direction of the jaw 14 when the latter is in its normal position shown in Figure 2, while on said trigger plate is a lip 25 that extends in the opposite direction from said pin. Intermediately pivoted on a pin 26 that is supported between the flanges 11, 11 and that extends transversely of the base near the end thereof adjacent to lip 24 is a latch 27, the same being adapted for vertical swinging movement between a pair of guide lugs 28 bent upward from the base, and at one end being formed with a hook 29 adapted to engage the bight portion of the jaw extension 15 when the jaw is swung to set position as shown in Figure 4, to hold the jaw in such position, and being extended at its other end as at 29 to engage with the lip 25 to hold the trigger plate 23 elevated, so that when the latter is depressed by an animal attempting to devour the bait thereon, the latch is moved to release the jaw extension permitting the trap to be sprung.

Reverting to the grid 20 it will be observed that the same covers the space between the parallel side and bight portions of the jaw 14, so that when the trap is set an animal is prevented from approaching the bait on the trigger from what may be termed the rear of the trap, and furthermore, after the trap has been sprung, said grid also serves as a guard to prevent animals from devouring the bait.

I claim:—

An animal trap comprising a base, a jaw pivoted thereon, a spring urging said jaw towards the base and releasable means including a bait carrying trigger device for holding said jaw in set position away from said base, said spring being bent to include a grid portion disposed to prevent an animal from approaching the bait through said jaw, and acting through said grid portion to swing said jaw towards the base.

In testimony whereof I hereunto affix my signature.

HUBERT M. EVANS.